United States Patent
Ohtomo (10) Patent No.: US 9,293,932 B2
(45) Date of Patent: Mar. 22, 2016

(54) VEHICLE INCLUDING A CHARGING PORT AND A LIGHT EMITTER

(71) Applicant: Fuji Jukogyo Kabushiki Kaisha, Tokyo (JP)

(72) Inventor: Yosuke Ohtomo, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 173 days.

(21) Appl. No.: 14/103,067

(22) Filed: Dec. 11, 2013

(65) Prior Publication Data

US 2014/0176069 A1    Jun. 26, 2014

(30) Foreign Application Priority Data

Dec. 25, 2012   (JP) ................. 2012-280644

(51) Int. Cl.
*H01M 10/46* (2006.01)
*H02J 7/00* (2006.01)
*B60L 11/18* (2006.01)
*B60L 3/00* (2006.01)

(52) U.S. Cl.
CPC ............ *H02J 7/0047* (2013.01); *B60L 3/0069* (2013.01); *B60L 11/1809* (2013.01); *B60L 11/1818* (2013.01); *B60L 11/1846* (2013.01); *B60L 2230/16* (2013.01); *B60L 2240/12* (2013.01); *B60L 2240/28* (2013.01); *B60L 2240/80* (2013.01); *B60L 2270/32* (2013.01); *B60L 2270/34* (2013.01); *Y02T 10/7005* (2013.01); *Y02T 90/121* (2013.01)

(58) Field of Classification Search
CPC . H02J 7/0047; B60L 11/1809; B60L 11/1818
USPC .................... 362/459; 320/104, 109
See application file for complete search history.

(56) References Cited

U.S. PATENT DOCUMENTS

| | | | | |
|---|---|---|---|---|
| 5,406,171 | A * | 4/1995 | Moody | 362/464 |
| 2009/0021364 | A1 | 1/2009 | Frey et al. | |
| 2010/0045450 | A1* | 2/2010 | Suzuki et al. | 340/438 |
| 2010/0246198 | A1* | 9/2010 | Hook et al. | 362/459 |
| 2011/0043355 | A1* | 2/2011 | Chander et al. | 320/109 |
| 2012/0238122 | A1* | 9/2012 | Hirashita et al. | 439/304 |

(Continued)

FOREIGN PATENT DOCUMENTS

| | | | |
|---|---|---|---|
| JP | 2005-278301 A | 10/2005 | |
| JP | 2009-269481 A | 11/2009 | |

(Continued)

OTHER PUBLICATIONS

JPO Decision to Grant dated May 12, 2015.

(Continued)

*Primary Examiner* — Edward Tso
(74) *Attorney, Agent, or Firm* — McGinn IP Law Group PLLC (57) ABSTRACT

In a vehicle, a lamp for illuminating a charging connector is provided in a charging port, and lighting and extinction of the lamp are controlled by a light emission controller. The light emission controller causes the lamp to emit light when an outer door is opened. Further, the lamp is extinguished after detecting that the outer door has been closed, the vehicle is traveling at a predetermined speed, an ignition switch has been switched ON, a door locking operation has been performed, or charging has begun.

16 Claims, 7 Drawing Sheets

(56) References Cited

U.S. PATENT DOCUMENTS

2013/0049972 A1    2/2013    Pusch et al.
2013/0078841 A1*    3/2013    Ferguson et al. ............ 439/350

FOREIGN PATENT DOCUMENTS

| | | |
|---|---|---|
| JP | 2010-004731 A | 1/2010 |
| JP | 2011-183860 A | 9/2011 |
| JP | 2012-045964 A | 3/2012 |
| JP | 2012-056327 A | 3/2012 |
| JP | 2012-064504 A | 3/2012 |
| JP | 4894611 B | 3/2012 |
| JP | 2012-080646 A | 4/2012 |
| JP | 2012-130189 A | 7/2012 |
| JP | 2012-205361 A | 10/2012 |
| JP | 2012-209098 A | 10/2012 |
| JP | 2012-226911 A | 11/2012 |
| JP | 2014-007861 A | 1/2014 |

OTHER PUBLICATIONS

JPO Second Notification of Refusal dated Mar. 3, 2015.
JPO First Notification of Refusal dated Nov. 26, 2014.

* cited by examiner

VEHICLE INCLUDING A CHARGING PORT AND A LIGHT EMITTER

CROSS-REFERENCE TO RELATED APPLICATIONS

The present application claims priority from Japanese Patent Application No. 2012-280644, filed on Dec. 25, 2012, the entire contents of which are hereby incorporated by reference.

BACKGROUND

1. Technical Field

The present invention relates to a vehicle that can be charged with power supplied from an external power supply.

2. Related Art

Conventional vehicles are mainly gasoline vehicles driven using gasoline as a fuel, and a gasoline fueling operation is typically performed at a specific fueling station provided with fueling facilities. On the other hand, in the case of an electric vehicle, a hybrid vehicle, or the like, which is charged by a supply of power received from an external power supply, charging can be performed in an increasing number of locations. In other words, a charging operation does not require use of a specific power feeding facility, and can be performed by receiving power supplied from a household power supply in a garage attached to a house or the like, for example. Accordingly, the charging operation may be performed in a location not provided with lighting facilities, in contrast to a fueling station or the like.

A charging connector for receiving the power supply includes various terminals for preventing electric shocks and the like. Therefore, when a power supply connector is coupled to the charging connector during the charging operation, the respective terminals must be connected accurately. Further, to prevent electric leakage caused by rainwater, a connection portion of the charging connector that is connected to the power supply connector is often disposed horizontally or oriented downward from horizontal. An operation to couple the power supply connector to the charging connector is therefore likely to be difficult when performed at night or in the dark.

In response to this problem, Japanese Unexamined Patent Application Publication No. 2011-183860 discloses a vehicle having a configuration for illuminating a power receiving connector (the charging connector) using a light source during charging processing. In this vehicle, the light source (a light emitter) is lit when an outer lid covering the power receiving connector is opened, and extinguished when a power feeding connector (the power supply connector) is connected (coupled) to the power receiving connector. Further, Japanese Patent No. 4894611 discloses a vehicle having a configuration for indicating a position of a charging port (the charging connector) by lighting a light emitter upon reception of a predetermined identification signal, and extinguishing the light emitter when a charging connector (the power supply connector) is coupled to the charging port.

By illuminating the charging connector when the outer lid covering the charging connector is opened or the predetermined identification signal is received in this manner, the position of the charging connector can be identified at the start of the charging operation. Further, by extinguishing the light emitter when the charging connector and the power feeding connector are coupled, unnecessary power consumption can be suppressed.

In certain cases, however, an operator may believe that the charging connector and the power feeding connector are coupled when, in actuality, a certain terminal is not connected or a coupling angle is inappropriate such that the connectors are coupled incompletely. In such cases, the coupling is released in order to perform the coupling operation again. If, in such case, the light emitter is configured to be extinguished when the charging connector and the power feeding connector are coupled, the light emitter is extinguished even though charging processing is not performed due to the incomplete coupling, and as a result, it is difficult for the operator to check for a coupling misalignment or the like. Furthermore, when the coupling operation is attempted several times such that the light emitter is lit and extinguished repeatedly every time, an efficiency of the operation deteriorates. Hence, when the condition for extinguishing the light emitter is that the charging connector and the power feeding connector are coupled, a problem may occur during the charging operation.

SUMMARY OF THE INVENTION

The present invention has been designed in consideration of the circumstances described above, and an object of the present invention is to provide a vehicle in which unnecessary power consumption during charging processing can be suppressed without impairing the convenience of a charging operation.

A first aspect of the present invention provides a vehicle including: a charging port having a charging connector to which a power supply connector for supplying external power can be attached; a door member to open and close the charging port; a light emitter to emits light in order to illuminate the charging connector when a predetermined condition is established; and an extinguisher to halt light emission by the light emitter when the door member is closed.

A second aspect of the present invention provides a vehicle including: a charging port having a charging connector to which a power supply connector for supplying external power can be attached; a door member to open and close the charging port; a light emitter to emit light in order to illuminate the charging connector when a predetermined condition is established; and an extinguisher to halt light emission by the light emitter when the vehicle travels at or above a predetermined speed.

A third aspect of the present invention provides a vehicle including: a charging port having a charging connector to which a power supply connector for supplying external power can be attached; a door member to open and close the charging port; a light emitter to emit light in order to illuminate the charging connector when a predetermined condition is established; and an extinguisher to halt light emission by the light emitter when an operation for making the vehicle capable of travel is performed.

A forth aspect of the present invention provides a vehicle including: a charging port having a charging connector to which a power supply connector for supplying external power can be attached; a door member to open and close the charging port, a light emitter to emit light in order to illuminate the charging connector when a predetermined condition is established; and an extinguisher to halt light emission by the light emitter when a door of the vehicle is locked.

A fifth aspect of the present invention provides a vehicle including: a charging port having a charging connector to which a power supply connector for supplying external power can be attached; a door member to open and close the charging port; a light emitter to emit light in order to illuminate the charging connector when a predetermined condition is established; and an extinguisher to halt light emission by the light emitter when supply of the external power is started.

DETAILED DESCRIPTION

Hereinafter, examples of the present invention will be described with reference to the drawings.

Figure 1:
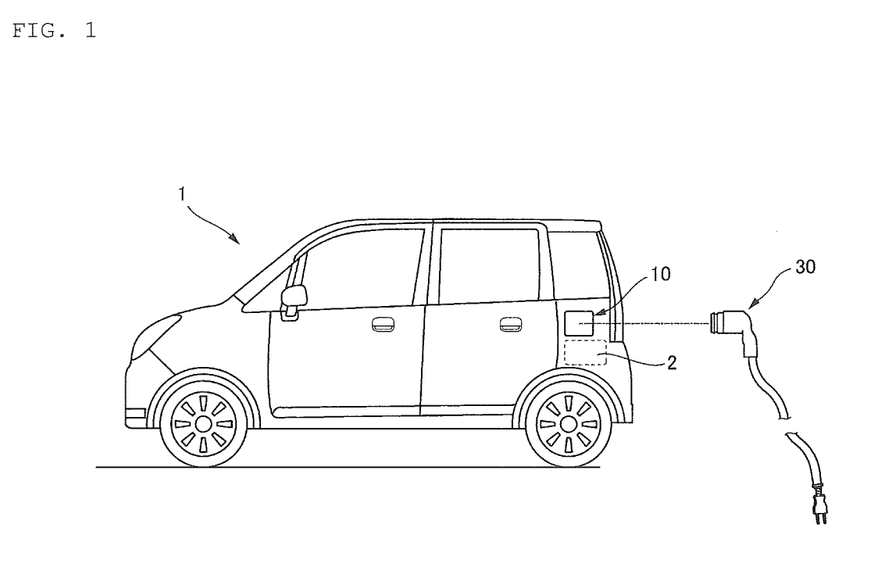
FIG. 1 is a view showing an overall configuration of a vehicle.

FIG. 1 shows a vehicle 1 according to an example of the present invention. The vehicle 1 includes a charging device 2 provided in an interior thereof, and a charging port 10 disposed on a rear side of the vehicle body. Note that the vehicle 1 may be an electric vehicle, in which case the vehicle is driven by a motor, or a hybrid vehicle, in which case the vehicle is driven by either one or both of an engine and a motor.

The charging device 2 can be charged with power from an external power supply, and supplies the power charged thereto to the vehicle 1 as motive power.

The charging port 10 is an opening formed in the rear side of the vehicle body, and can be opened and closed by an outer door 11 that is coupled to an opening edge of the charging port 10 via a hinge. A charging connector 20 connected to the charging device 2 is provided inside the charging port 10, and lamps 13 serving as the light emitter of the present invention are provided on an inner walls of the charging port 10. The lamp 13 is constituted by a light emitting diode. In this example, the charging port 10 is provided on the rear side of the vehicle body, but is not limited to this position and may be provided on any of a front side, a front, and a rear of the vehicle. Further, the lamp 13 according to this example is a light emitting diode, but may be constituted by another light source such as an incandescent lamp.

Figure 2:
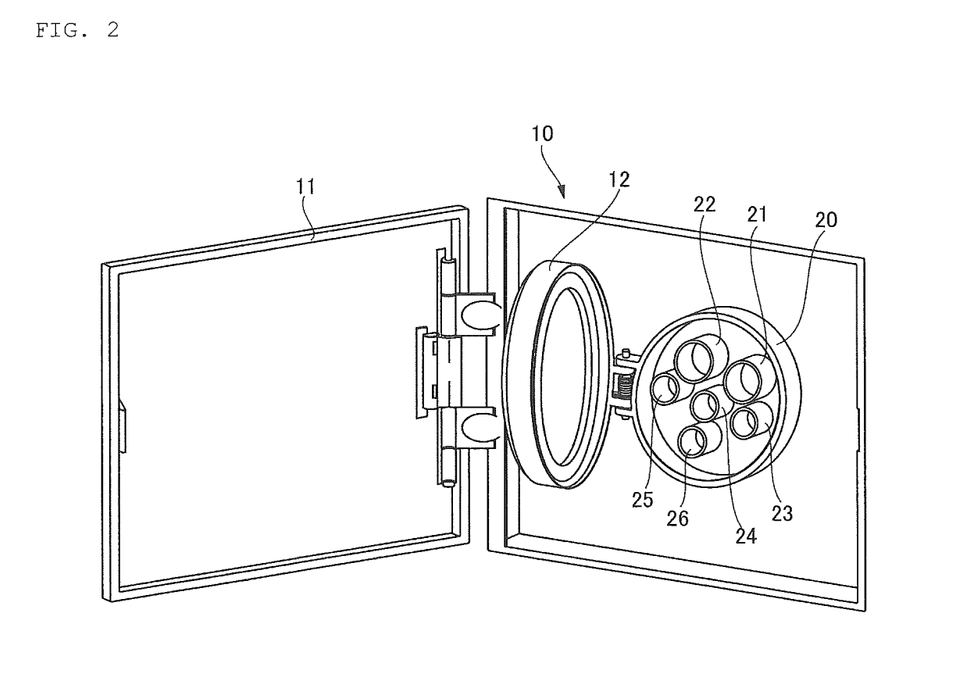
FIG. 2 is a perspective view of a charging port.

As shown in FIG. 2, the charging port 10 is opened by opening the outer door 11. An outer door opening/closing detector 50 for detecting opening and closing of the outer door 11 is provided on the hinge part of the outer door 11. The outer door opening/closing detector 50 is connected to a light emission controller 130, to be described below. The outer door 11 is half-opened by operating a charging port opening lever provided on a driving seat of the vehicle 1. The half open outer door 11 is then fully opened manually by an operator, whereupon a charging operation can be performed.

The charging connector 20 can be opened and closed by an inner door 12 that is coupled to the vicinity of a connection port of the charging connector 20 via a hinge. When the inner door 12 is opened, the connection port of the charging connector 20 is exposed such that a power feeding gun 30 can be coupled thereto. The charging connector 20 is connected to the charging device 2 via a conductive cable, not shown in the drawings, such that power is supplied to the charging device 2 from an external power supply through the coupled charging connector 20 and power feeding gun 30.

Figure 3:
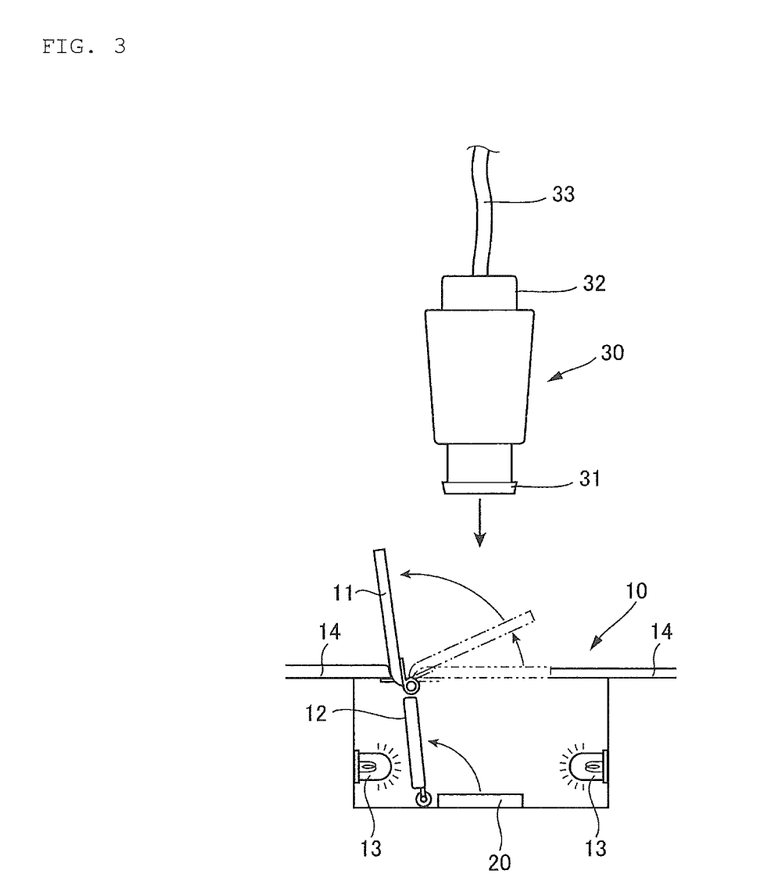
FIG. 3 is a plan view showing a configuration of the charging port.

As shown in FIG. 3, left and right inner walls of the charging port 10 are formed in positions recessed respectively to the left and right from an opening provided in an outer panel 14 of the vehicle 1. The lamp 13 is disposed on each of the left and right inner walls. The charging connector 20 is illuminated by direct light emitted from the lamps 13, while the emission of direct light to the outside of the charging port 10 is blocked by the outer panel 14. As a result, the operator performing charging processing can confirm the position of the charging connector 20 at night or in the dark without being dazzled by direct light emitted into the eyes. Lighting and extinction of the lamps 13 are controlled by the light emission controller 130, which is provided in the vehicle 1 to serve as an electronic control unit (ECU) for controlling light emission from the lamps 13.

Further, the charging connector 20 is provided with six connection terminals (sockets), namely charging sockets 21 and 22 serving as terminals of a power line, a connection detection socket 23 serving as a terminal of a connection detection signal line, a charging start/stop signal socket 24 serving as a terminal of a charging start/stop signal line, a charging control signal socket 25 serving as a terminal of a charging control line, and an earth socket 26. Furthermore, the connection port of the charging connector 20 is provided horizontally or at a nearly horizontal angle to prevent electric leakage occurring when rainwater or the like infiltrates the charging connector 20 through the connection port.

Figure 4:
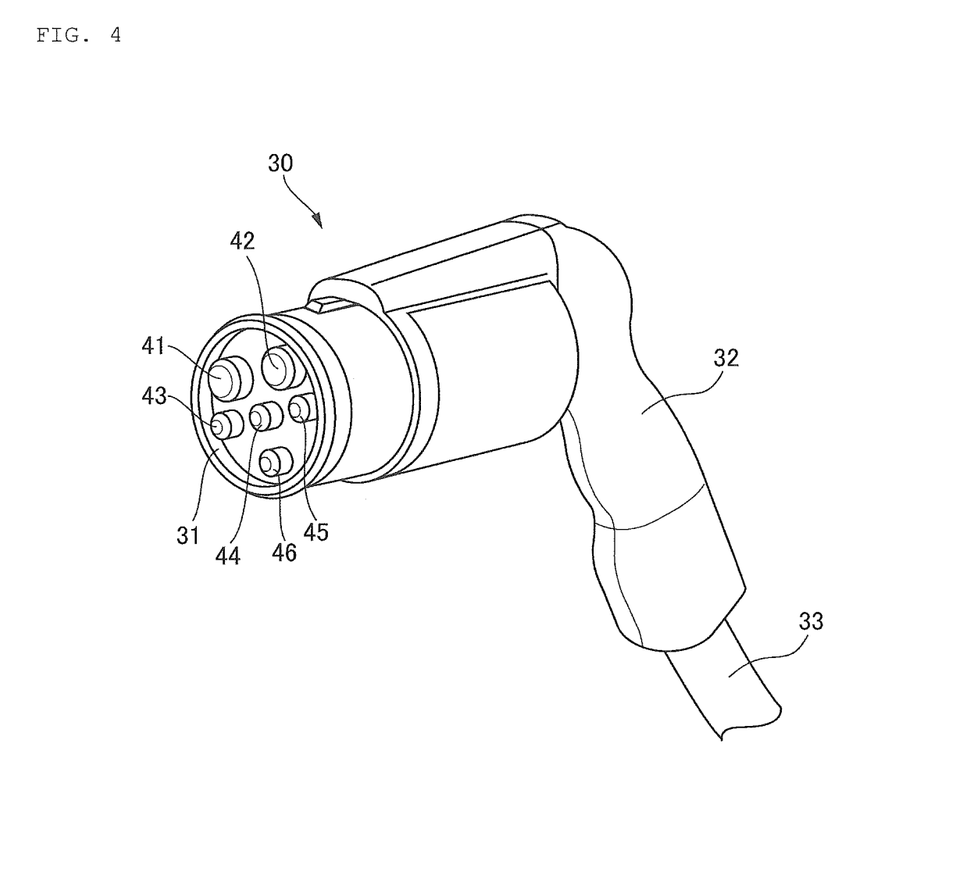
FIG. 4 is a perspective view of a power feeding gun.

As shown in FIG. 4, the power feeding gun 30 is constituted by a power supply connector 31 that can be coupled to the charging connector 20, a handle 32 that is gripped by the operator, and a power supply cord 33 that can be connected to the external power supply. The power supply connector 31 is provided with six connection terminals (pins), namely charging pins 41 and 42, a connection detection pin 43, a charging start/stop signal pin 44, a charging control signal pin 45, and an earth pin 46. By inserting the various pins simultaneously into the various corresponding pins provided in the charging connector 20, the charging connector 20 can be coupled to the power supply connector 31, whereby power from the external power supply can be supplied to the charging device 2 through the power supply cord 33.

As described above, the connection port of the charging connector 20 is provided horizontally or at a nearly horizontal angle, and therefore the operator, whose eye line is diagonally above the charging connector 20 during the charging processing, must perform the operation to insert the various terminals accurately in a condition where the various connection terminals of the charging connector 20 cannot be viewed easily. By illuminating the charging connector 20 and the periphery thereof using the lamps 13, however, the operation for coupling the charging connector 20 and the power supply connector 31 can be performed easily.

Figure 5:
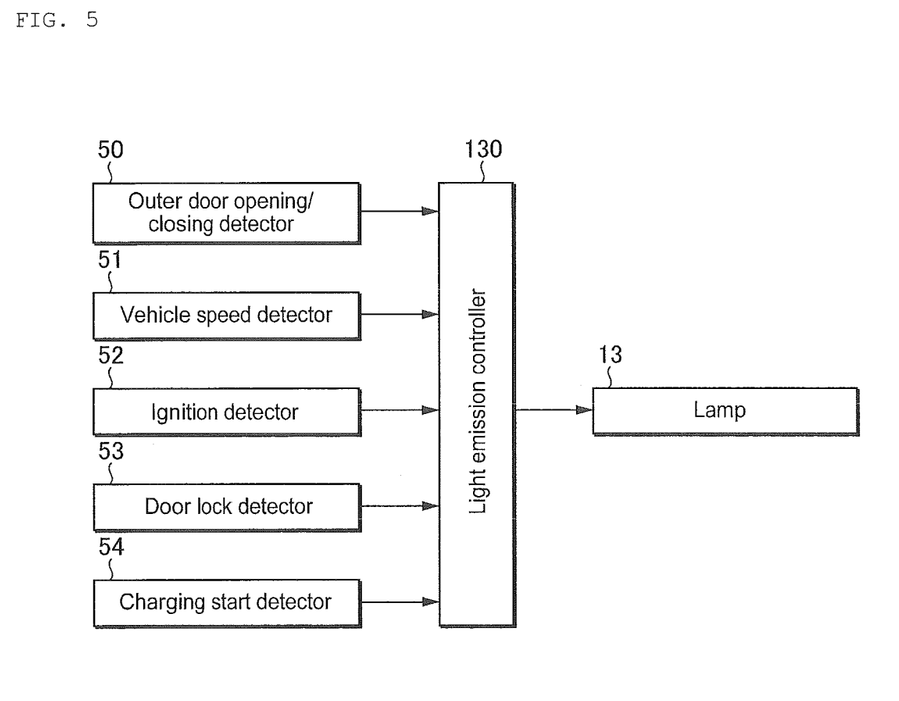
FIG. 5 is a block diagram showing input and output of signals into and from a light emission controller.

Further, as shown in FIG. 5, the vehicle 1 includes a vehicle speed detector 51 for detecting a travel speed of the vehicle 1, an ignition detector 52 for detecting whether or not an ignition switch serving as a switch of an ignition device of the engine and a starting device of the motor of the vehicle 1 (when the vehicle 1 is an electric vehicle, the ignition switch functions only as the switch of a device for operating the motor) is ON, a door lock detector 53 for detecting whether or not respective doors of the vehicle 1 have been locked, and a charging start detector 54 for detecting whether or not a voltage has been applied to the charging sockets 21 and 22 of the charging connector 20.

The outer door opening/closing detector 50, the vehicle speed detector 51, the ignition detector 52, the door lock detector 53, and the charging start detector 54 are connected to an input side of the light emission controller 130 such that respective detection signals thereof are input into the light emission controller 130. Further, the lamps 13 are connected to an output side of the light emission controller 130 such that a light emission control signal and an extinction control signal are output to the lamps 13.

Figure 6:
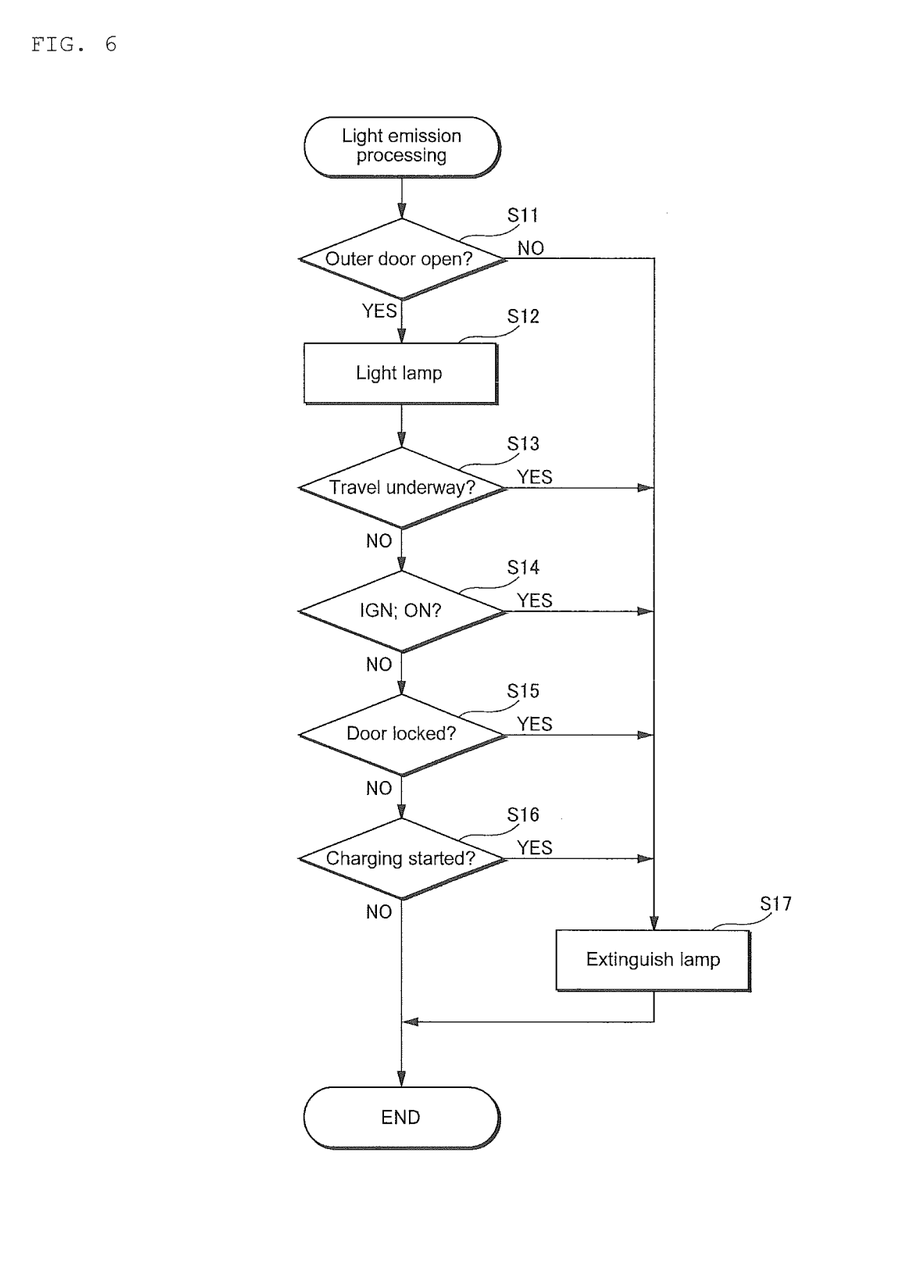
FIG. 6 is a view showing light emission processing.

Next, using FIG. 6, light emission processing performed on the lamps 13 by the light emission controller 130 will be described. A processing flow shown in FIG. 6 is executed at predetermined period intervals (every four milliseconds, for example).

First, in step S11, the light emission controller 130 determines whether or not an open detection signal has been input from the outer door opening/closing detector 50. The outer door opening/closing detector 50 outputs the open detection signal continuously while the outer door 11 is open. In other words, the light emission controller 130 determines in this step whether or not the outer door 11 is open. When the open detection signal has been input from the outer door opening/closing detector 50, the processing advances to step S12, and when the open detection signal has not been input from the outer door opening/closing detector 50, or in other words when the outer door 11 is closed, the processing advances to step S17.

When the outer door 11 is open, the light emission controller 130 performs processing in step S12 for causing the lamps 13 to emit light by outputting the light emission control signal to the lamps 13. As a result, the lamps 13 emit light such that when the outer door 11 is half open, the light leaks out through the charging port 10, thereby notifying the operator of the position of the charging port 10, and when the outer door 11 is fully open, the light illuminates the charging connector 20 and the periphery thereof, thereby facilitating the operation for coupling the charging connector 20 to the power supply connector 31. The lamps 13 continue to emit light until the extinction control signal is input.

While the lamps 13 emit light, the light emission controller 130 determines in step S13 whether or not a vehicle speed detection signal has been input from the vehicle speed detector 51. The vehicle speed detector 51 outputs the vehicle speed detection signal after detecting that the vehicle 1 is traveling at or above a predetermined travel speed (5 km/h in this example). In other words, the light emission controller 130 determines in, this step whether or not the vehicle 1 is traveling at or above 5 km/h. When the vehicle speed detection signal has been input from the vehicle speed detector 51, the processing advances to step S17, and when the vehicle speed detection signal has not been input from the vehicle speed detector 51, the processing advances to step S14.

In step S14, the light emission controller 130 determines whether or not an ON signal has been input from the ignition detector 52, or in other words whether or not the ignition switch is ON. When the ON signal has been input from the ignition detector 52, the processing advances to step S17, and when the ON signal has not been input from the ignition detector 52, the processing advances to step S15.

In step S15, the light emission controller 130 determines whether or not a locking operation detection signal has been input from the door lock detector 53. The door lock detector 53 outputs the locking operation detection signal when an operation is performed to lock any one of the doors of the vehicle 1. In other words, the light emission controller 130 determines whether or not an operation has been performed to lock one of the doors of the vehicle 1. The door lock detector outputs the locking operation detection signal when an operation to lock a door is performed and not when the door is already locked. When the locking operation detection signal has been input from the door lock detector 53, the processing advances to step S17, and when the locking operation detection signal has not been input, the processing advances to step S16.

In step S16, the light emission controller 130 determines whether or not a charging start detection signal has been input from the charging start detector 54. The charging start detector 54 outputs the charging start detection signal after detecting that current has been caused to flow along the power line such that a voltage is applied to the charging sockets 21 and 22, but does not output the charging start detection signal merely when the charging connector 20 is coupled to the power supply connector 31. In other words, the light emission controller 130 determines whether or not charging from the external power supply has begun. When the charging start detection signal has been input from the charging start detector 54, the processing advances to step S17, and when the charging start detection signal has not been input, the light emission processing is terminated.

In step S17, the light emission controller 130 performs processing to extinguish the lamps 13 by outputting the extinction control signal to the lamps 13. In so doing, the lamps 13 are extinguished when the outer door 11 is closed, when the vehicle 1 travels at or above the predetermined speed, when the ignition switch is switched ON, when an operation is performed to lock any one of the doors, or when charging from the external power supply is started. When this processing is complete, the light emission processing is terminated.

As described above, to perform charging from the external power supply, first, the operator opens the outer door 11 by operating the charging port opening lever provided on the driving seat of the vehicle 1. When this operation is performed, the outer door 11 half-opens, and the lamps 13 emit light that leaks out through a gap in the half open outer door 11. As a result, the operator can grasp the position of the charging port 10 easily even at night or in the dark.

Next, the operator opens the outer door 11 fully, then opens the inner door 12 to expose the charging connector 20, and then couples the power supply connector of the power feeding gun 30 to the exposed charging connector 20. At this time, the pins of the power supply connector 31 must be inserted into the respective sockets of the charging connector 20, but since the charging connector 20 and the periphery thereof are illuminated by the lamps 13, positioning and coupling can be performed easily.

When the outer door 11 is closed, when the vehicle 1 travels at the predetermined speed, when the ignition switch is switched ON, when the door locking operation is performed, or when charging begins, it may be determined that there is no longer any need to illuminate the charging connector 20 using the lamps 13, and therefore the lamps 13 are extinguished. In so doing, unnecessary power consumption can be suppressed, and travel in a condition where the lamps 13 continue to emit light can be prevented.

Figure 7A:
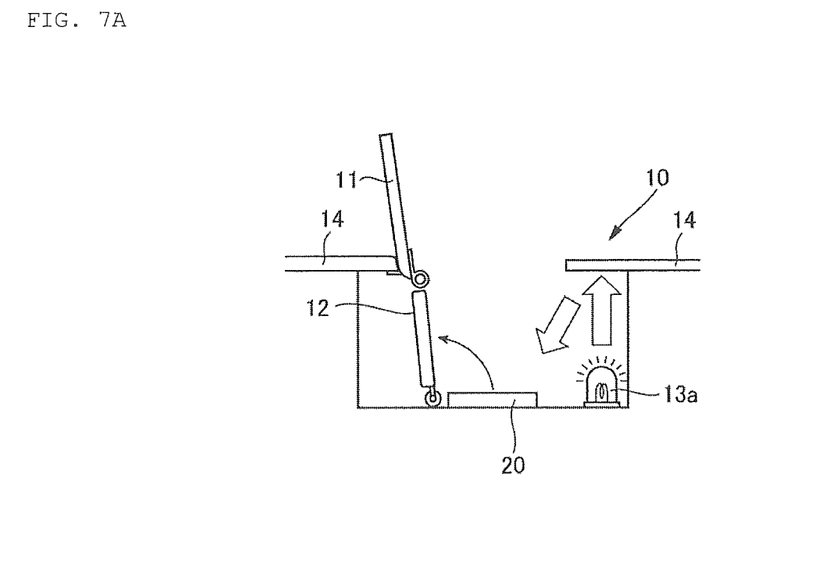
FIG. 7A and FIG. 7B are plan view showing a configuration of a charging port according to modified examples.
Figure 7B:
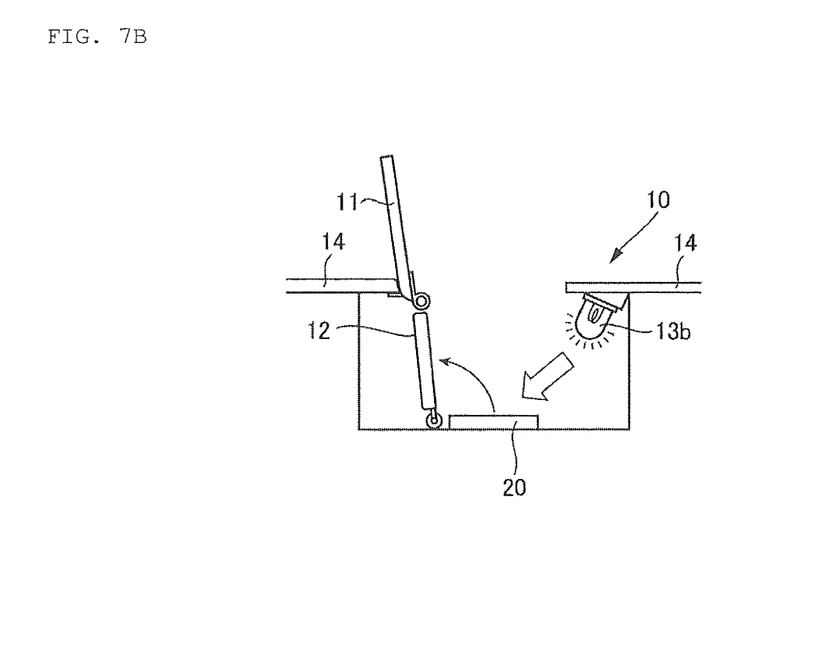

FIGS. 7A and 7B show configurations of the charging port 10 according to other examples of the present invention. Note that parts having similar configurations to the above example have been allocated identical reference numerals.

In the charging port 10 shown in FIG. 7A, a lamp 13a is provided in a position opposing the outer panel 14 and adjacent to the charging connector 20. When the lamp 13a emits light, the light is emitted toward an inner surface of the outer panel 14. The emitted light is reflected by an inner side of the outer panel 14 so as to illuminate the charging connector 20 and the periphery thereof. In other words, the charging connector 20 is illuminated by indirect illumination from the lamp 13, while the emission of direct light to the outside of the charging port 10 is blocked by the outer panel 14.

In the charging port 10 shown in FIG. 7B, a lamp 13b is provided on the inner side of the outer panel 14 in a position opposing the charging connector 20 in a diagonal direction. When the lamp 13b emits light, direct light is emitted toward the charging connector 20 in a diagonal direction so as to illuminate the charging connector 20 and the periphery thereof. In this case, the lamp 13b emits light toward the inside of the charging port 10, and therefore no direct light is emitted to the outside of the charging port 10.

In the examples described above, the lamp 13 (the lamp 13a, and the lamp 13b) is extinguished when any one condition is established from among closure of the outer door 11, travel at the predetermined speed by the vehicle 1, switching ON of the ignition switch, performance of the door locking operation, and the start of charging. The present invention is not limited thereto, however, and the lamp 13 may be extinguished when several conditions among these are established or following the elapse of a predetermined time after one of the conditions is established, for example.

Further, the lamp 13 is extinguished after detecting that a current has been caused to flow through the power line such that a voltage is applied to the charging sockets 21 and 22 (see step S16 in FIG. 6), but the present invention is not limited thereto, and the lamp 13 may be extinguished when a communication signal indicating the start of charging is input into the light emission controller 130 from the charging device 2 or the power feeding gun 30, for example.

Furthermore, the lamp 13 is lit when the outer door 11 is opened (see step S11 in FIG. 6), but the present invention is not limited thereto, and the lamp 13 may be lit when another condition is established. For example, the lamp 13 may be lit when a light emission switch provided on a portable device of a vehicular keyless entry system, the driving seat, the power feeding gun 30, or the like is operated, or when the power feeding gun 30 is brought close to the lamp 13.

The invention claimed is:

1. A vehicle comprising:
   a charging port having a charging connector to which a power supply connector for supplying external power can be attached;
   a door member to open and close the charging port;
   a light emitter to emit light in order to illuminate the charging connector when a predetermined condition is established;
   an extinguisher to halt light emission by the light emitter when supply of the external power is started, and to halt light emission by the light emitter when any one of the followings is established:
      a door of the vehicle is locked;
      the door member is closed;
      the vehicle travels at or above a predetermined speed; and
      an operation for making the vehicle capable of travel is performed; and
   a door lock detector to output a locking operation detection signal when an operation is performed to lock the door of the vehicle,
   wherein the extinguisher halts light emission by the light emitter when the locking operation detection signal is output, and
   wherein the door lock detector does not output the locking operation detection signal when the door is already locked, and outputs the locking operation detection signal when an operation to lock the door is performed.

2. The vehicle according to claim 1, wherein, the extinguisher halts light emission by the light emitter following the elapse of a predetermined time after any one of the conditions for halting light emission by the light emitter is established.

3. The vehicle according to claim 1, wherein, the extinguisher halts light emission by the light emitter following the elapse of a predetermined time after any one of the conditions for halting light emission by the light emitter is established.

4. The vehicle according to claim 1, wherein, the extinguisher halts light emission by the light emitter following the elapse of a predetermined time after any one of the conditions for halting light emission by the light emitter is established.

5. The vehicle according to claim 1, wherein the extinguisher halts light emission by the light emitter when at least one of the following conditions are established:
   supply of the external power is started;
   the door of the vehicle is locked;
   the door member is closed;
   the vehicle travels at or above a predetermined speed; and
   the operation for making the vehicle capable of travel is performed.

6. The vehicle according to claim 2, wherein the extinguisher halts light emission by the light emitter when at least one of the following conditions are established:
   supply of the external power is started;
   the door of the vehicle is locked;
   the door member is closed;
   the vehicle travels at or above a predetermined speed; and
   the operation for making the vehicle capable of travel is performed.

7. The vehicle according to claim 3, wherein the extinguisher halts light emission by the light emitter when at least one of the following conditions are established:
   supply of the external power is started;
   the door of the vehicle is locked;
   the door member is closed;
   the vehicle travels at or above a predetermined speed; and
   the operation for making the vehicle capable of travel is performed.

8. The vehicle according to claim 4, wherein the extinguisher halts light emission by the light emitter when at least one of the following conditions are established:
   supply of the external power is started;
   the door of the vehicle is locked;
   the door member is closed;
   the vehicle travels at or above a predetermined speed; and
   the operation for making the vehicle capable of travel is performed.

9. The vehicle according to claim 1, wherein the extinguisher halts light emission by the light emitter when all of the following conditions are established:
   supply of the external power is started;
   the door of the vehicle is locked;
   the door member is closed;
   the vehicle travels at or above a predetermined speed; and
   the operation for making the vehicle capable of travel is performed.

10. The vehicle according to claim 1, wherein the charging port includes a cavity having the charging connector to which the power supply connector for supplying external power can be attached;
   wherein the light emitter is disposed inside the cavity of the charging port, and
   wherein the light emitter emits light based on a proximity of an object to the charging port.

11. The vehicle according to claim 10, wherein an edge of an outer panel of the vehicle protrudes over the cavity such that the light emitter is disposed below the edge of the outer panel.

12. The vehicle according to claim 10, wherein an edge of an outer panel of the vehicle protrudes over the cavity.

13. The vehicle according to claim 12, wherein the light emitter is disposed on a bottom surface of the edge of the outer panel such that the light emitter is facing the charging connector.

14. The vehicle according to claim 12, wherein the light emitter is disposed at an angle on a bottom surface of the edge of the outer panel.

15. The vehicle according to claim 10, wherein the light emitter is disposed on a bottom surface of the cavity of the charging port.

16. The vehicle according to claim 10, wherein the light emitter is disposed on a side surface of the cavity of the charging port.

* * * * *